United States Patent [19]
Summerer et al.

[11] Patent Number: 5,793,591
[45] Date of Patent: Aug. 11, 1998

[54] STRAY VOLTAGE REDUCTION DEVICE

[75] Inventors: Raymond E. Summerer, Otsego; Karl T. Person, Portage, both of Mich.

[73] Assignee: Meco Corporation, Otsego, Mich.

[21] Appl. No.: 745,407

[22] Filed: Nov. 8, 1996

[51] Int. Cl.$^6$ .................................................. H04H 3/18
[52] U.S. Cl. ............................. 361/86; 361/56; 361/43; 361/220; 307/326
[58] Field of Search ............................ 361/42–45, 56, 361/86, 212, 220, 232; 307/326, 327

[56] References Cited

U.S. PATENT DOCUMENTS

| | | | |
|---|---|---|---|
| 3,784,842 | 1/1974 | Kremer | 307/92 |
| 4,573,098 | 2/1986 | Williston | 361/42 |
| 4,816,956 | 3/1989 | Hertz et al. | 361/42 |
| 4,942,313 | 7/1990 | Kinzel | 307/326 |
| 5,075,620 | 12/1991 | Shaw | 324/122 |
| 5,321,318 | 6/1994 | Montreuil | 307/326 |
| 5,465,051 | 11/1995 | Graham | 324/713 |

OTHER PUBLICATIONS

Stray Voltage–Proceedings of the National Stray Voltage Symposium–Oct. 10–12, 1984, American Society of Agricultural Engineers, pp. 87–99, 129–173.

Dairy Cattle Response to Transient Voltages and Magnetic Fields IEEE Rural Electric Power Conference, Apr. 24–26, 1994, (Abstract).

Effects of Electrical Voltage/Current on Farm Animals, US Dept of Agriculture Handbook, No. 696, Dec., 1991, pp. 2–1 to 2–23 & 4–1 to 7–18.

*Primary Examiner*—Jeffrey A. Gaffin
*Assistant Examiner*—Michael Sherry
*Attorney, Agent, or Firm*—Edward J. Timmer

[57] ABSTRACT

Stray voltage reduction system for reducing electrical shocks to livestock in a farm and similar building wherein the system senses a voltage between first and second components, such as metal stall stanchion and metal water trough, of a livestock enclosure or holding area and electrically shorts the first and second components for a preset time period when a stray voltage beyond a preset trigger voltage potential difference is detected between the first and second components. The device includes a voltage sensing circuit for sensing voltage between the first and second components, a comparator, and electrical shorting circuit that can include a relay actuated switch responsive to the output of the comparator when a sensed potential difference between the first and second components equals or exceeds a preset trigger value to electrically short (switch closed by relay) the components for a time to reduce the voltage below the trigger value. The device is advantageous to reduce stray voltage between first and second components in a livestock enclosure and thus electrical current to which livestock in the enclosure may be subjected.

11 Claims, 3 Drawing Sheets

STRAY VOLTAGE REDUCTION DEVICE

FIELD OF THE INVENTION

The present invention relates to devices for reducing or eliminating problems from detrimental levels of stray voltage associated with electrical power systems used for farm and similar enviroments in which livestock are present to reduce electrical current flow through livestock resulting from the livestock contacting components or regions at different electrical protentials due to stray electrical fields or current.

BACKGROUND OF THE INVENTION

The presence of stray voltages from electrical power supply systems on farms is now recogonized as a problem and has been associated with the loss of milk production on dairy farms. In particular, stray voltage may subject dairy cows to low level currents when the cows occupy a milking parlor stall or holding area and come in contact with stall components, such as a stachion and watering cup or trough of the stall or concrete, which are at different electrical potentials as a result of the presence of stray ground voltages.

The problem of stray voltage and its adverse effect on livestock is discussed in U.S. Pat. Nos. 4,573,098; 4,816,956; 5,321,318; and 5,465,051. These patents provide rather complex and costly stray voltage suppression systems for mitigating stray voltage effects on livestock.

SUMMARY OF THE INVENTION

The present invention provides a stray voltage reduction system for reducing current flow through livestock or animals on a farm and similar environments wherein the system senses a voltage between first and second components or regions present at a livestock occupied area, such as between a metal stanchion and metal water trough of a barn stall, and intermittently electrically shorts the first and second components when contacted by livestock and a stray voltage at or above a preset trigger voltage is detected between the first and second components or regions.

The present invention provides a stray voltage reduction system comprising voltage sensing means for sensing voltage between the first and second components or regions present at the livestock occupied area when contacted by livestock, voltage comparator means, and electrical shorting means responsive to the comparator means that a sensed potential difference between the first and second components is at or above the preset trigger value to thereby electrically short the components for a preset time period which is beyond the time the stray voltage is imposed between the components. In one embodiment of the present invention, the device includes a voltage detector, a voltage comparator and the electrical shorting means comprises a normally open electrical shunt or switch connected between the first and second components and actuated by a relay in response to a signal from the comparator so as to close the relay and electrically short the components for a preset time period in response to a sensed voltage between the components exceeding the preset trigger voltage. The time period can be chosen to eliminate short time oscillating stray voltage patterns between the first and second components or regions.

The present invention is advantageous to significantly reduce stray voltage potentials between first and second components or regions of a livestock environment when livestock contacts the components and thus reduce electrical curent flow to which livestock may be subjected.

DETAILED DESCRIPTION OF THE INVENTION

The present invention provides a stray voltage reduction system for reducing electrical current flow through livestock on a farm and other livestock or animal occupied areas when the livestock contact components or regions at different electrical potentials due to presence of stray voltage. The stray voltage reduction system of the invention is operative to sense a voltage between first and second components or regions of an area occupied by livestock, such as a stall, feeding area, fenced area and the like, when the animal contacts the components or regions and electrically short the components or regions for a time when a stray voltage at or above a preset trigger voltage is detected between the components or regions to reduce to a harmless level stray voltage to which an animal at the area would be subjected when the animal comes in contact with the components or regions. The first and second components or regions at the livestock occupied area can comprise first and second metal components, a metal component and nonmetal component such as cement floor or ground, two regions on a cement floor contacted by the animal (e.g. at legs C3, C4) and/or earth, etc. where the components or regions are at different voltages or potentials as a result of presence of AC and/or DC stray voltage for example. For example, the water trough 12 can be at a sufficiently different electrical potential relative to leg contact point C3 or C4 with the floor to cause an electrical current to flow through the cow between the cow contact points C2 and C3 or C4 in similar manner.

In an embodiment of the present invention offered for purposes of illustration and not limitation, the aforementioned first and second components of a livestock enclosure may comprise a metal stanchion 10 of a barn stall S and a metal water trough or cup 12 of the same barn stall. A cow standing in the barn stall S on a concrete floor F formed on the ground or earth G can contact the stanchion 10 and water trough 12 or water therein at the same time, for example, when the cow drinks water from the trough 12 while leaning against or otherwise contacting the stanchion 10.

For example, if AC or DC stray voltage is present in the ground G and concrete floor F at the stall S in a farm environment, the stanchion 10 and water trough 12 can be at sufficiently different electrical potentials to cause an electrical current to flow through the cow between the cow contact points C1, C2 when the cow contacts the stanchion 10 and trough 12. As mentioned hereabove, such current flow has been found to significantly reduce production of milk by dairy cows.

Figure 2:
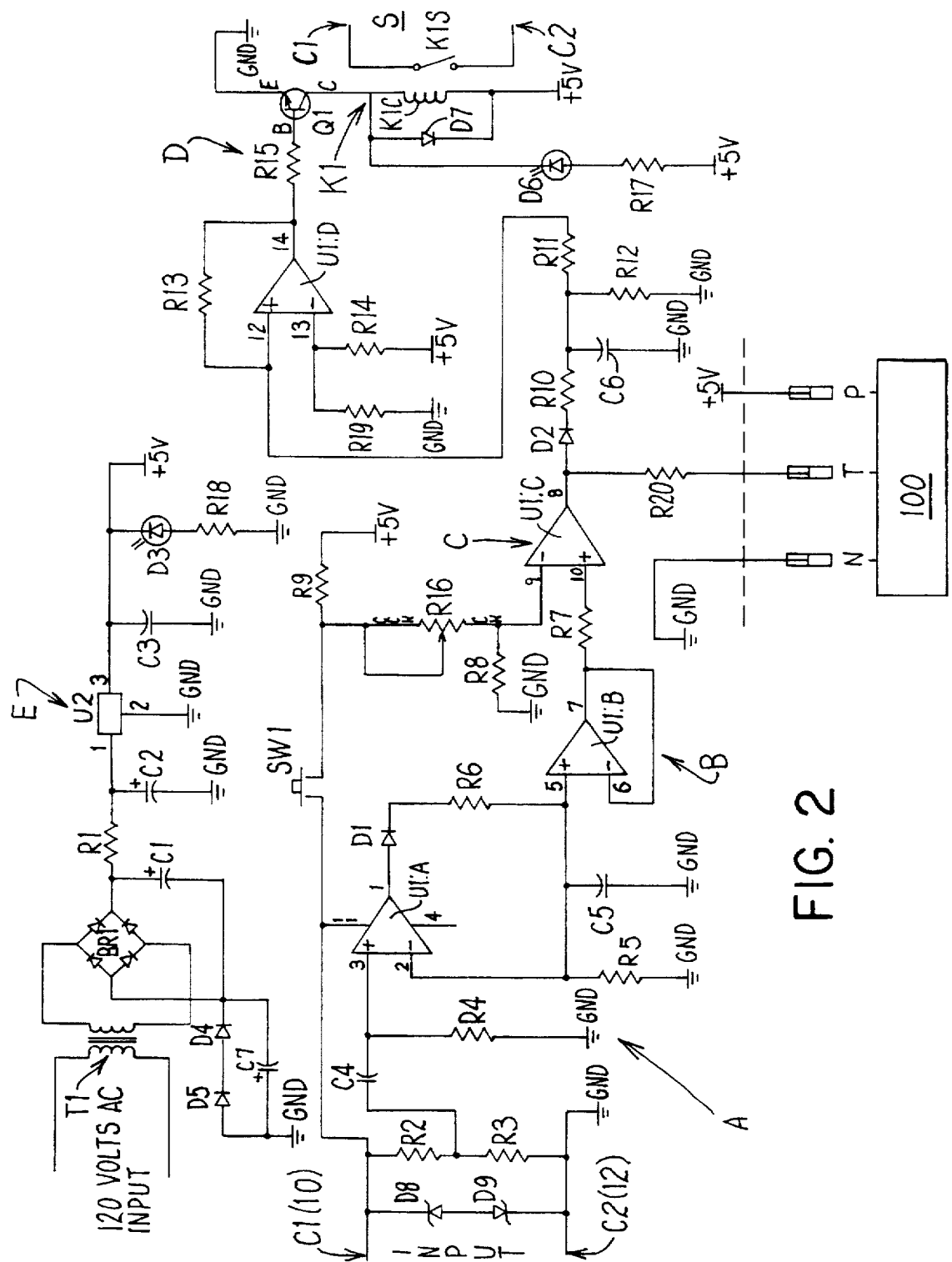
FIG. 2 is an electrical schematic diagram of a stray voltage reduction device having a voltage sensing circuit, comparator and stray voltage arresting circuit that electrically shorts the stanchion and trough to reduce current flow through the cow in the stall of FIG. 1.

Referring to FIG. 2, a stray voltage reduction system for reducing stray voltage between the stanchion 10 and water trough 12 due to AC and/or DC stray voltage when the cow contacts them is shown for purposes of illustration and not of limitation. The system includes a stray voltage sensing circuit A connected to a stray voltage arresting circuit D via a buffer section B and comparator section C as shown in FIG. 2. The arresting circuit D is operative to electrically short the stanchion 10 (C1) and trough 12 (C2) when a stray voltage between the stanchion and trough is sensed equal to or exceeding a preset voltage to reduce the stray voltage. The trigger voltage of the stray voltage reduction system is preset at a desirable value that will avoid a harmful electrical current or shock to the cow in the barn stall S. That is, the trigger voltage is preset to prevent the cow from being exposed to high stray voltages that are known to adversely affect the cow, such as its milk production.

The stray voltage reduction device of FIG. 2 is initially calibrated to preset a trigger voltage by applying a 60 cycle sine wave input as a simulated stray voltage using a suitable transformer connected across contacts C1, C2. For example, for a dairy cow in stall S, a typical trigger voltage at contact points C1, C2 can be set at 0.7 peak volts of the 60 cycle sine wave input across contacts C1, C2 (that simulates stray voltage) at or beyond which peak voltage dairy cow milk production is adversely affected. This peak voltage of the 60 cycle sine wave at contact points C1, C2 corresponds to a 0.5 volt root mean square (rms) 60 cycle signal that will constitute a baseline trigger voltage used by the stray voltage reduction system.

The voltage sensing circuit A is adapted to receive AC and/or DC voltages or spikes or square waves that may be present at the cow contact points C1, C2 from various sources of existing stray voltage and that can cause a current to flow through a cow at the stall S when the cow contacts the stanchion 10 and trough 12. The input section comprises Zener diodes D8 and D9 which protect the system from high voltage at the input. The combination of resistors R2, R3, R4 and capacitor C4 is selected to set input impedance to that of the livestock that will occupy the stall S (e.g. about 500 Ohms for a cow or about 250 Ohms for a pig).

The voltage sensing circuit A includes a voltage detector U1:A coupled with a voltage integrator comprising R-C circuit section including resistor R5 and capacitor C5 that can store energy from stray voltages at C1, C2 for use by the device. When the stray voltage reduction device is initially calibrated for use with a dairy cow in stall S for example using the aforementioned 60 cycle sine wave input at contacts C1, C2, the resistor R5 and capacitor C5 in conjunction with a calibration adjustment of variable resistor R16 are used to preset the system baseline trigger voltage. For example, a trigger voltage of 0.5 volts rms is preset when the 60 cycle voltage sine wave input (simulating stray voltage) at cow contact points C1, C2 is equal to 0.7 peak volts. The aforementioned trigger voltage of 0.5 rms is offered only for purposes of illustration since the stray voltage reduction system can be preset at another trigger voltage value as needed to avoid harmful electrical current flow to the cow (or other animal) in the barn stall S.

The voltage detector U1:A comprises a conventional operational amplifier such as integrated circuit model no. LM324 available commercially. One-way current diode D1 provides reverse current protection and isolation for the voltage detector U1:A. The current limiting/biasing resistor R6 provides current protection for buffer isolation amplifier U1:B and sets bias.

The buffer or isolation amplifier U1:B acts as an isolation amplifier via current-limiting resistor R7 between operational amplifiers U1:A and U1:C to ward off loading affects of the rest of the circuit. The buffer amplifier U1:B comprises a conventional operational amplifier such as integrated circuit model no. LM324 available commercially.

The stray voltage reduction system includes a voltage comparator section C comprising an integrated circuit U1:C (commercially available integrated circuit model no. LM234) operated in a comparator mode and protected and isolated by one-way current diode D2 from the R-C circuit that includes resistor R12 and capacitor C6. The resistor arrangement including resistors R8, R9, and variable (adjustable) resistor R16 function to provide current to comparator U1:C and to provide adjustment of the trigger voltage of the stray voltage reduction device. In particular, the variable resistor R16 is adjusted during calibration of the device as described above such that the comparator U1:C (that compares input and reference voltages at its terminals or points "9" and "10") will output a signal to actuate the voltage arresting circuit D when the voltage at contacts C1, C2 detected by the voltage sensing section A equals or exceeds the 0.5 volts rms trigger value.

The output signal of the comparator U1:C will turn on and actuate the stray voltage arrestor circuit D which includes operational amplifier U1:D (commercially available integrated circuit model no. LM324), a transistor Q1, and an electrical shorting means such as a relay K1 (e.g. a conventional reed switch relay) having a coil K1C and a normally open relay shunt or switch K1S connected across cow electrical contact points C1, C2. Other shorting devices can used in practice of the invention such as optical isolator devices and other devices which can electrically short or connect the contacts C1, C2 for a time period.

Once triggered, the comparator U1:C will provide an output signal via isolation resistor R10 and amplifier biasing resistor 11 to terminal "12" of the operational amplifier U1:D to trigger the amplifier U1:D. Amplifier U1:D has associated therewith bias setting resistors R14, R19 for terminal "13" and feedback and stablizing resistor R13. The amplifier U1:D, when triggered by comparator U1:C, turns on transistor Q1 via current-limiting/base current setting resistor R15 in order to actuate the relay K1 to short the contacts C1, C2 by closing of the normally open relay shunt or switch K1S connected across cow electrical contact points C1, C2.

When stray voltage at contacts C1, C2 is detected to equal or exceed the preset trigger value, the comparator U1:C outputs a signal to actuate the arresting circuit D to short the cow electrical contact points C1, C2 in approximately 2 to 5 milliseconds by actuation of relay K1 to close electrical shunt K1S. The relay remains actuated for a preset time period or delay determined by the R-C circuit section comprising capacitor C6 and resistor R12. Typically, the selected preset time period during which the relay K1 is actuated is set at 20 seconds to 2 minutes to this end, stopping arrestor circuit chatter as well. The time period typically is chosen to be long enough in duration to eliminate short time oscillating stray voltage patterns between the cow contact points C1, C2. The relay is protected by diode D7 from induced voltage after the relay switch K1S is openeded following expiration of the time period.

When triggered, the transistor Q1 also actuates an LED indicator light D6 connected to voltage source (+5 volts) via resistor R17. The indicator light provides a visual alert that the stray voltage system is operating.

Switch SW1 is provided to test the arresting circuit D by manually turning on LED indicator light D6.

The stray voltage reduction system includes a power supply section E that steps down the incoming AC line voltage through transformer T1 to provide the device operational power of approximately 12 volts rms. In turn, the secondary transformer voltage is rectified by the diode bridge BR1 and is filtered using the diodes D4, D5 and filtering capacitors C1, C7. Capacitors C2, C3 reduce ripple of the rectified output of the diode bridge. The rectified power is supplied via series resistor R1 to input terminal "1" of a 5 volt voltage regulator U2 that in turn provides at output terminal "3" a +5 volts supply for the amplifiers as well as other system components in the manner shown in FIG. 2.

The power supply circuit includes a light emitting diode D3 connected to ground via resistor R18 to provide a visual indication when the power supply circuit is active.

Figure 1:
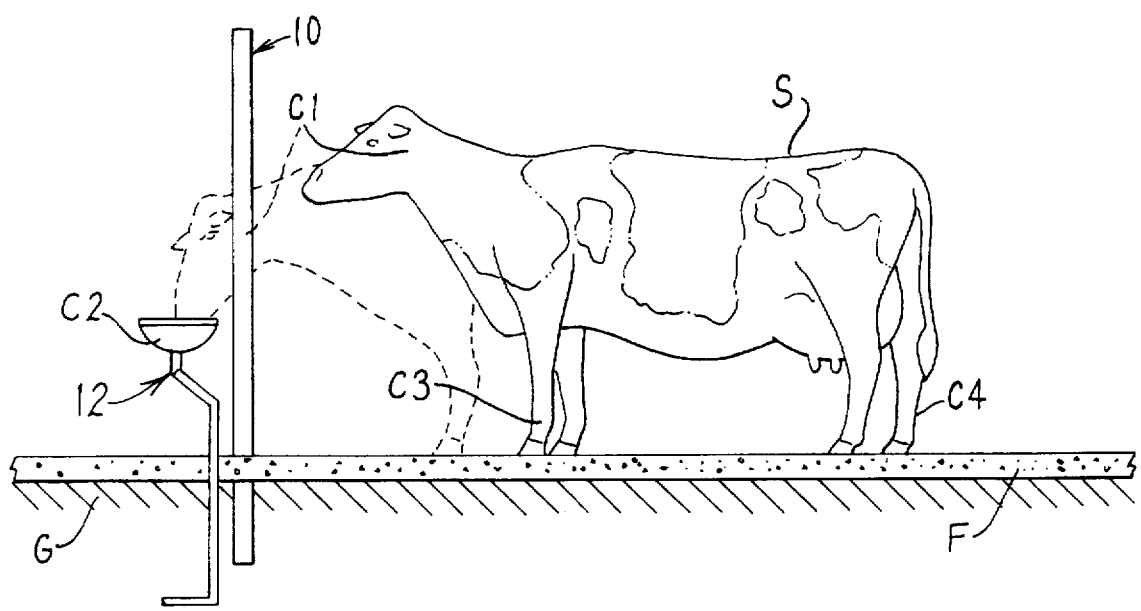
FIG. 1 is a schematic view of a cow in an enclosure, such as a stall of a barn, where the stray voltage reduction device in accordance with the invention can reduce electrical current flow through the cow from potential differences between the stanchion and water trough which the cow contacts.

In operation, when a cow in the barn stall S comes in contact with stachion 10 and trough 12 and/or water therein (cow electrical contact points C1, C2) shown in FIG. 1 which are at different voltages as a result of the presence of stray voltage, the voltage sensing section A and comparator section C of the stray voltage reduction device will determine if stray voltage across contacts C1, C2 is sufficient to exceed the preset system trigger voltage (e.g. 0.5 volts rms). If the detected stray voltage does not exceed the preset trigger value, the arresting circuit D will remain inactive by virtue of the comparator section C not providing an appropriate actuating signal to the arrestor circuit D.

On the other hand, if the stray voltage is determined by the voltage sensing section A and comparator section C to equal or exceed the preset trigger value, the comparator section C will output a signal to actuate the stray voltage arresting circuit D in the manner described above to in turn actuate relay K1 to close the normally open relay shunt or switch K1S connected across cow electrical contact points C1, C2. The arresting circuit D will short the voltage across cow electrical contact points C1, C2 in approximately 2 to 5 milliseconds by actuation of relay K1 to close electrical shunt K1S and will remain activated for the preset period of time determined by resistor R12 and capacitor C6 as described to reduce the stray voltage below the preset trigger voltage. The selected preset time period or delay for actuation of relay K1 can be set at 20 seconds to 2 minutes to this end. The time period typically is chosen to be long enough in duration to eliminate short time oscillating stray voltage patterns between the cow contact points C1, C2. The stray voltage across contact points C1, C2 to which the cow may be subjected is reduced nearly instanteously to negligble harmless levels by the arrestor circuit.

When the aforementioned trigger voltage is preset at 0.5 volt rms, the spray voltage reduction device of FIG. 2 can operate to reduce DC stray voltage when contact C1 is positive relative to contact C2. At higher preset trigger voltage values of for example, 0.7 volt rms, the device will operate to reduce DC stray voltage regardless of polarity of contacts C1, C2.

Figure 3:
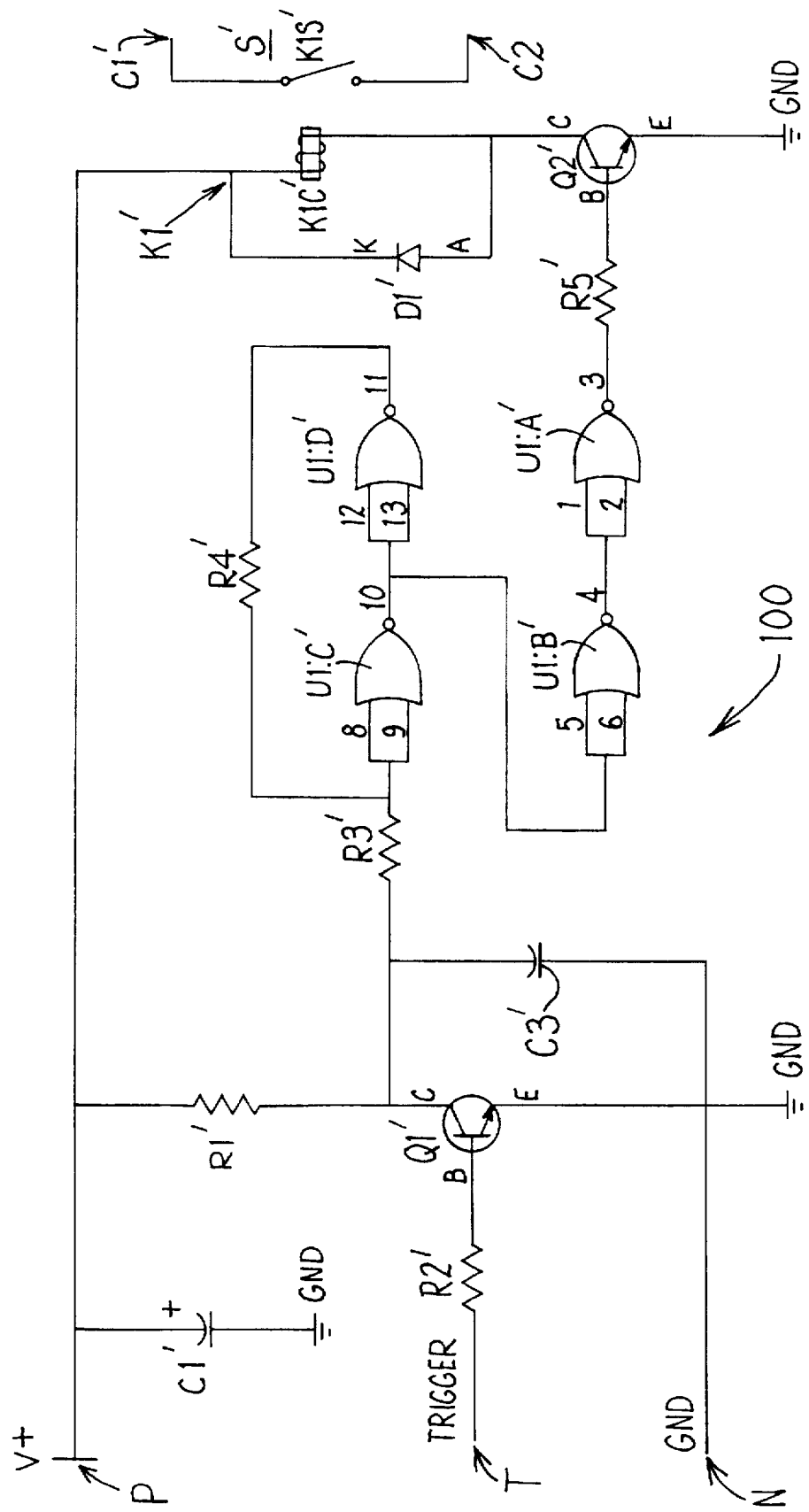
FIG. 3 is an electrical schematic diagram of a remote stray voltage arresting circuit for use with the device of FIG. 2.

The primary stray voltage reduction device described above may include output terminals N (neutral), T (trigger), and P (positive) that can be connected by respective wires to like terminals of a second (third, fourth, etc.) arrestor device 100, FIG. 3, residing at a second barn stall remote from the first stall S to provide stray voltage protection at that second stall. The second remote stray voltage arrestor device can include an arresting circuit, FIG. 3, similar to that described hereabove in components used and function but does not include the voltage sensing section A, buffer section B and comparator section C since these are present in the primary stray voltage reduction device at the primary stall S as shown in FIG. 2. The second remote arrestor 100 is powered by the primary stray voltage reduction device as also shown in FIG. 2.

To this end, referring to FIG. 3, the second remote arrestor 100 includes a first transistor Q1' having filtering capacitor C1' and current limiting resistor R1' associated therewith. The transistor Q1' is turned on by the output signal of comparator U1:C through current limiting resistor R20 of the primary device, FIG. 2, located at stall S. The transistor Q1' via bias setting resistor R3' turns on the quad two NOR gate integrated circuits U1:C', U1:B', U1:C', and U1:D' (integrated circuits commercially available as model no. LM358) having feedback and stabilizing resistor R4' and that, in turn, turn on transistor Q2'. Capacitor C3' provides a path to ground for any AC current that may be present in the arresting circuit. When turned on, transistor Q2' actuates the relay K1' having coil K1C' and normally open relay shunt or switch K1S' connected across cow electrical contact points C1', C2' at the remote stall S'. That is, the relay K1' is actuated to close the switch K1S' for a time period determined as described above to reduce stray voltage for a preset time period.

The present invention is advantageous to reduce stray voltage effects in a livestock environment and thus electrical current flow to which livestock may be subjected.

Although the present invention has been described with respect to certain embodiments thereof, it is not intended to be limited thereto, and modifications, changes, and adaptions can be made therein without departing from the scope of the appended claims.

We claim:

1. Stray voltage reduction device for an animal occupied area, comprising voltage sensing means for sensing voltage between first and second components of the animal occupied area when the animal contacts said components, a voltage comparator means, and electrical shorting means responsive to said comparator means that a sensed voltage difference between the first and second components at least equals a preset trigger value to electrically short the components to reduce the sensed voltage below the preset trigger value.

2. The device of claim 1 wherein the first and second components comprise first and second components of a stall.

3. The device of claim 1 wherein the first and second components of comprise different regions of a floor or the earth.

4. The device of claim 1 wherein said voltage sensing means comprises a voltage detector providing a detected voltage to said comparator for determining if the detected voltage exceeds said preset trigger value.

5. The device of claim 1 wherein said electrical shorting means comprises means responsive to the output of the comparator to short the first and second components when the detected voltage at least equals said preset trigger value.

6. The device of claim 5 wherein said electrical shorting means comprises a normally open electrical shunt connected between the first and second components and a relay operable in response to output of said comparator to close said shunt to electrically short the first and second components.

7. The device of claim 6 wherein said relay comprises a reed switch relay.

8. The device of claim 6 wherein said relay is actuated by an amplifier and transistor turned on in response to the output of the comparator.

9. The device of claim 1 wherein said electrical shorting means includes timing means for discontinuing shorting of said first and second components after a preset time period.

10. The device of claim 9 wherein said timing means comprises a timing circuit between a comparator and a transistor that actuates a relay.

11. The device of claim 1 which further includes an additional electrical shorting means disposed at a second enclosure and electrically connected to said voltage sensing means so as to be responsive to a sensed potential difference between the first and second components beyond a preset trigger value to electrically short third and fourth components at said second enclosure to reduce the sensed voltage below the trigger value.

* * * * *